Dec. 12, 1967     H. L. WILLIAMS     3,357,680
BUTTERFLY VALVE DISK
Filed April 2, 1965
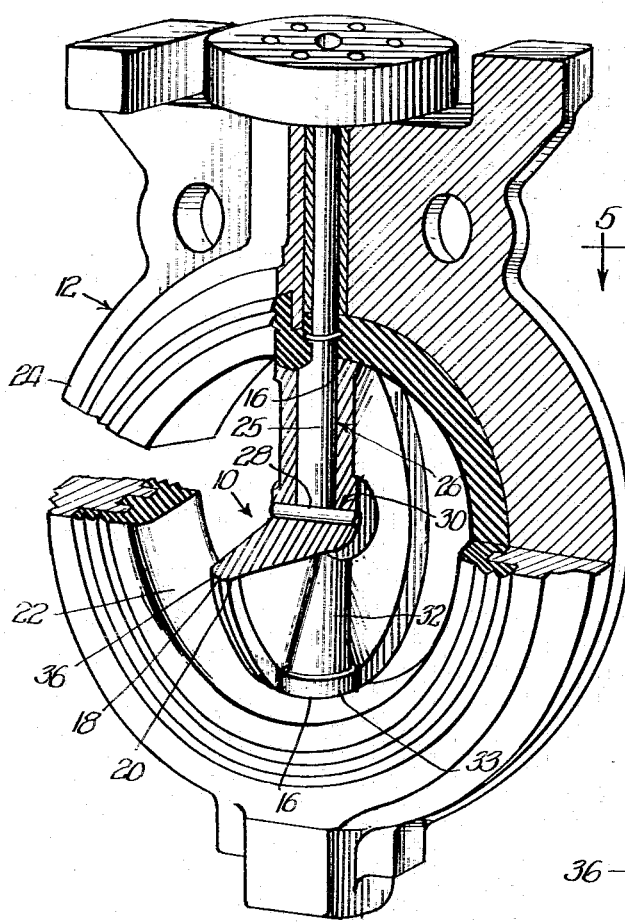
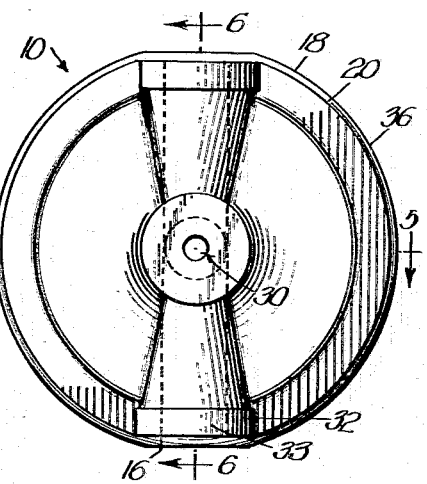
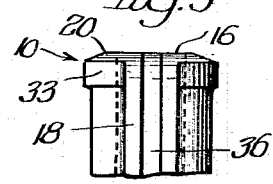
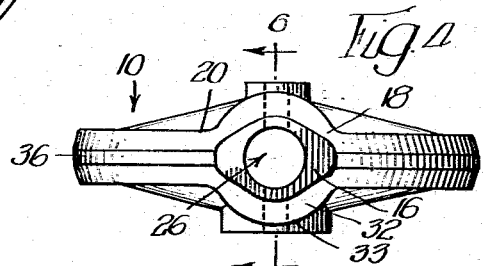
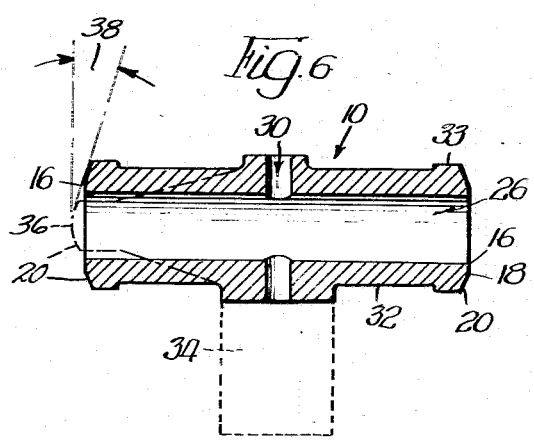
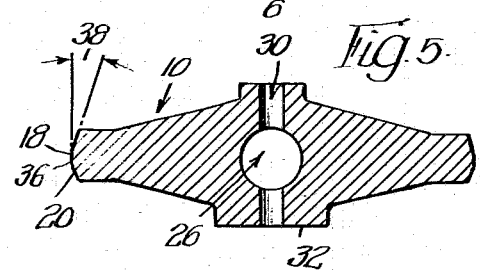

United States Patent Office

3,357,680
Patented Dec. 12, 1967

3,357,680
BUTTERFLY VALVE DISK
Hubert L. Williams, Hinsdale, Ill., assignor to Crane Company, Chicago, Ill., a corporation of Illinois
Filed Apr. 2, 1965, Ser. No. 444,965
4 Claims. (Cl. 251—305)

ABSTRACT OF THE DISCLOSURE

A butterfly valve in which the disk therein has closure edge surfaces, each of which is a fully closed uninterrupted constant angle frustro-conical beveled surface completely encircling one side of each of the rotational bearing surface areas on the disk. The rotational bearing surface areas are chordal and enclosed within the geometric surface of revolution of the disk peripheral edge surface.

---

The present invention relates to valve disks for butterfly valves and methods for their manufacture.

In the prior manufacture of butterfly valve disks the annular peripheral or closure edge of the valve disk was provided with beveled surfaces having a bevel angle of approximately 28 to 30 degrees. Such angles were considered necessary to prevent excessive binding between the valve disk and the valve seat which would require excessive torque for valve closure. The required manufacturing operations for the disk included intermittently grinding these beveled surfaces. The grinding of the beveled surfaces was interrupted at each rotational bearing area or "flat." The interruption was essential to prevent grinding into the rotational bearing areas, which were geometrically intersected by the beveled surfaces. Additional and distinct beveled surfaces were formed around each side of each rotational bearing area. The number of intermittent and distinct surfaces and the non-use of turning methods resulted in a high manufacturing cost for each valve disk.

It is an object of the present invention to provide a butterfly valve disk, and method of manufacture therefor, providing a simplified valve disk of significantly reduced manufacturing cost.

It is a further object of the present invention to provide a novel valve disk configuration and a novel method of valve disk manufacture wherein a valve disk is provided having good operating characteristics, including reasonable closure torque levels and good sealing, yet having a substantially simplified surface configuration and a significantly reduced cost of manufacture.

A more specific object of the present invention is to provide a method of forming butterfly valve disks by which the peripheral surface of the disk blank, including the beveled surfaces thereon, may be formed in a continuous turning operation.

Another more specific object of the present invention is to provide a butterfly valve disk on which the peripheral annular edge surface substantially defines a geometric surface of revolution including beveled surfaces having a reduced bevel angle, and the rotational bearing surface areas are enclosed within said surface of revolution.

Other objects and advantages of the present invention will be apparent from the following detailed description of an exemplary embodiment of the invention and the drawings forming a part thereof, in which:

FIGURE 1 is a perspective view in partial cross section of a butterfly valve mounting a valve disk in accordance with the invention;

FIGURE 2 is a side view of the valve disk of FIGURE 1;

FIGURE 3 is a partial edge view of the valve disk of FIGURES 1 and 2;

FIGURE 4 is a top view of the valve disk of FIGURES 1–3;

FIGURE 5 is a cross sectional view of the valve disk of FIGURES 1–4 taken along the line 5—5 in FIGURE 2; and FIGURE 6 is a cross sectional view of the valve disk of FIGURES 1–5 taken along the line 6—6 in FIGURES 2 and 4.

Referring to the drawings, there is shown in FIGURES 1–6 an exemplary butterfly valve disk 10 in accordance with the present invention. In FIGURE 1 the disk 10 is shown mounted inside an exemplary conventional butterfly valve 12. As may be particularly seen from FIGURES 2–6, the valve disk 10 differs significantly from prior valve disk construction in that the peripheral or closure edge surface 18 of the disk is formed as a continuous surface of revolution which includes a pair of continuous frustro-conical beveled surfaces 20, each having a bevel angle substantially less than that of prior valve disks. It will also be noted that no portion of either of the two rotational bearing surfaces or "flats" 16 on the disk periphery extends beyond this surface of revolution, and that there are no separate beveled surfaces around the rotational bearing surfaces 16.

Considering first in detail the rotatable mounting of the disk 10 in the butterfly valve 12, it is to be appreciated that the valve disk of the invention is not limited to any specific mounting means or to employment with any particular butterfly valve construction. The illustrated structures are merely exemplary. The valve 12 shown includes a valve seat 22 of rubber or other suitable material which is preferably molded into a valve body 24. The disk 10 is fixed to a rotatably mounted operating shaft 25 within the valve body 24 and positioned so that the peripheral edge surface 18 of the disk will seal with the seat 22 when the disk is rotated closed. The shaft 25 preferably closely fits through the disk in a large central aperture 26 which extends in the plane thereof. The shaft 25 is secured to the disk 10 by a tapered pin 28 which fits simultaneously through the shaft 25 and through the disk at a small central tapered aperture 30 perpendicular the plane of the disk. Each of the rotational bearing surfaces 16 provides a tight seal and a rotational bearing between the disk and the seat 22 around the aperture 26.

The disk 10 preferably has a relatively thin generally planar circular disk configuration. However, it preferably has an enlarged portion 32 of generally cylindrical configuration extending centrally across the disk in the plane thereof. The enlarged portion 32 provides increased disk material thickness to surround the large central aperture 26, which extends axially therethrough. Preferably the central aperture 26 is a cylindrical bore and centrally intersects the edge surface 18 at each end.

Each end of the enlarged portion 32 extends out to the edge surface 18 of the disk and provides thereon an enlarged peripheral surface area around the central aperture 26, i.e., a semi-circular extension in the normal width of the edge surface 18 at each side of the disk. An annular extending rim 33 at each end of the enlarged portion 32 adds to this enlarged surface area.

Turning to the novel configuration of the exemplary disk 10 at its edge surface, the edge surface 18 describes a closed geometric surface of revolution concentric to the central perpendicular axis of the disk. This surface of revolution defines the maximum radial extension of the disk, i.e., the geometric surface of revolution completely encloses all of the disk material, and is preferably only interrupted by the two rotational bearing surfaces 16.

Preferably located centrally on the peripheral edge 18 is a narrow annular cylindrical surface 36. The cylindrical surface 36 defines the maximum radial dimensions of the disk and the maximum diameter of the surface of revolution. It assists in effective sealing, but is not essential and an operative valve disk may be formed which provides only the beveled surfaces 20.

The pair of beveled surfaces 20 illustrated herein are preferably similar frustro-conical annular surfaces, frustrated by the cylindrical surface 36. They occupy the entire edge surface 18 not otherwise occupied by the cylindrical surface 36 therebetween or the bearing surfaces 16. Each beveled surface preferably continuously intersects with one edge of the cylindrical surface 36 except at the rotational bearing surfaces 16, where each beveled surface intersects with one side of the bearing surface instead. Each beveled surface 20 is preferably beveled inwardly of the disk and of the cylindrical surface 36 at a bevel angle 38 in a preferred range of 10 to 15 degrees, and most preferably from 11 to 13 degrees, or approximately 12½ degrees. This bevel angle 38 is significantly and substantially less than the prior conventional bevel angles of 28 to 30 degrees. It will be appreciated that the beveled surface 20 may have a slightly concave, convex or other curvature as may be conventionally provided for certain valve applications.

Considering the beveled surfaces 20 on the portion of the edge surface 18 intersecting the enlarged portion 32, the beveled surfaces 20 preferably form the entire peripheral edge surface of the enlarged portion 32. This is in contrast to the prior disk configurations, in which separate bevel surfaces were required. Each beveled surface 20 encircle one side of the rotational bearing surface 16 on each enlarged portion 32, thereby forming an even beveled surface surrounding each bearing surface. This surface is identical to, and a geometric continuation of, each beveled surface 20 as may be readily seen in FIGURE 6 where a portion of FIGURE 5 is coaxially superimposed in dot-dash lines. In FIGURES 2 through 4, the absence of any lines indicating a surface transition in each surface 20 will be noted.

Considering the pair of opposing bearing surfaces 16, each is preferably planar, parallel the central perpendicular axis of the disk, and perpendicularly intersecting the central aperture 26. Each surface 16 is preferably chordal the edge surface 18 and thereby truncates the cylindrical surface 36 and the beveled surfaces 20 on the enlarged portion 32. That is, the preferred configuration is that of a small plane surface intersecting with, and enclosed within (recessed from), the surface of revolution defined by the peripheral edge 18. Thus, the surfaces 16 and 36 are at different radial distances from the center of the disk 10.

Turning now to the preferred novel method of disk manufacture, the disk 10 is preferably initially formed as a disk blank by casting, stamping or other suitable conventional rough forming methods from a suitable valve disk material such as cast iron, bronze or Monel. The preferred disk blank configuration is generally that of the final disk 10.

As indicated by the broken outline in FIGURE 6, preferably there is formed on the disk blank in the initial rough forming operation an integral cylindrical lug 34 extending perpendicularly and centrally from one side of the disk 10. The lug 34 is removed later in the manufacturing operation and is not present on the finished disk 10. It provides a mounting or chucking extension by which the disk 10 may be held and rotated about its central perpendicular axis during manufacture.

In finishing the disk 10 from the rough formed disk blank, the central aperture 26 and the tapered aperture 30 may be formed at any time during the manufacturing process. It will be noted that these apertures may be provided by conventional machining operations while the lug 34 is chucked, since the tapered aperture 30 is preferably co-axial with the lug 34, and the central aperture 26 is preferably perpendicular and intersecting the axis of the lug 34.

A principal simplification in the manufacture of the disk 10 is in the formation of the peripheral edge surface 18. Continuous beveling is required on the peripheral edge surface of any rotary valve disk to prevent binding between the edge and the valve seat as the disk is rotated into the closure position. Generally speaking, increasing the angle of bevel decreases the torque resistance to valve closure and is desirable. Accordingly, it has previously been deemed essential in conventional butterfly valve construction to form bevel angles of between 28 to 30 degrees. In order to provide a peripheral edge surface with such a large bevel angle the major beveled edge surfaces were formed by an intermittent grinding operation, interrupted at each rotational bearing surface. Then in a separate grinding operation minor beveled surfaces were separately formed around the rotational bearing surfaces. Intermittent surface formation by grinding rather than turning was required to form each of these beveled surfaces, since the geometric extension of the major beveled surfaces would cut through the rotational bearing surfaces.

The present preferred method of forming the edge surface 18 is a significant departure from the above described prior method. The entire peripheral edge surface 18, including the beveled surfaces 18, is formed as an uninterrupted surface of revolution in one constant radius turning operation. The preferred arrangement for continuously rotating the disk is to hold the disk blank by the lug 34 and rotate the disk about the lug axis.

The surfaces of the enlarged portion 32 at the edge surface 18 are preferably finished simultaneously and identically with the beveled surfaces 20, in the same machining operation, eliminating an entire manufacturing step of forming separate beveled surfaces around the rotational bearing surfaces 16. Thus the only surfaces separately formed are the rotational bearing surfaces 16.

The rotational bearing surfaces 16 are preferably formed on the valve disk after the formation of the surface of revolution, i.e., after the turning of the beveled surfaces 20 and cylindrical surface 36. The preferred method for forming each surface 16 is to machine additional material from the peripheral edge of the disk at each enlarged portion 32 down to a plane surface. The entire surface of the disk peripheral edge preferably having been already machined, only the small amount of material need be removed around each opening of the central aperture 26 corresponding to the difference between the arcs and the chords of the surface of revolution. Note particularly FIGURE 6 in this regard. Accordingly, the surfaces 16 may be formed by a small end mill or other suitable means while the disk is still being held by the lug 34.

The above described manufacturing steps, and conventional finishing operations such as deburring, constitute the entire preferred manufacturing process. If the entire machining operation has been carried out while the disk is held by the extending lug 34 the final steps would include separating the disk from the lug in a suitable manner, such as by a parting tool.

It may be seen that there has been provided, by the novel disk configuration and method of manufacture described herein, a butterfly valve disk having a substantially simplified form and lower manufacturing cost, yet this disk has sealing characteristics fully equivalent to prior disks and closure torque levels well within acceptable operating tolerances.

Various modifications and variations of the disk and the methods of its manufacture in accordance with the invention will be apparent to those skilled in the art, and it is intended to encompass in the accompanying claims all such variations and modifications as lie within the true spirit and scope of the invention.

What is claimed is:

1. In a butterfly valve having a resilient seat in the valve body:

a butterfly valve disk adapted to form a closure member in said valve with said resilient seat, said disk having an annular peripheral closure edge surface, each edge surface including bevel surfaces at each side of said disk, each said bevel surface defining a single geometric surface of revolution, a pair of oppositely spaced rotational bearing surfaces on said edge surface enclosed within said geometric surfaces of revolution, said bearing surfaces truncating said edge surface, each said bevel surface encircling one side of each of said bearing surfaces, and each said bevel surface being a single continuous uninterrupted surface all on said single geometric surface of revolution.

2. In a butterfly valve having a resilient seat in the valve body:

a butterfly valve disk adapted to form a closure member in said valve with said resilient seat, said disk having an annular peripheral closure edge surface, said edge surface including bevel surfaces at each side of said disk, each said bevel surface defining a single geometric surface of revolution and having a bevel angle to said disk, a pair of oppositely spaced rotational bearing surfaces on said edge surface enclosed within said geometric surfaces of revolution, said bearing surfaces truncating each edge surface and having a radial distance from the center of said disk less than the maximum radial dimensions of said edge surface, each said bevel surface encircling one side of each of said bearing surfaces, and each said bevel surface having a bevel angle which is constant around said entire edge surface.

3. The butterfly valve of claim 2 wherein said bevel angle is between 10 and 15 degrees.

4. The butterfly valve of claim 2 wherein said bevel angle is approximately 12½ degrees.

References Cited

UNITED STATES PATENTS

| 3,204,927 | 9/1965 | Killian | 151—306 |
| 3,241,806 | 3/1966 | Snell | 251—306 X |
| 3,263,960 | 8/1966 | Trefil et al. | 251—306 |

M. CARY NELSON, *Primary Examiner.*

R. C. MILLER, *Assistant Examiner.*